Aug. 26, 1930.   W. F. SHANNON   1,773,878
PISTON RING
Filed Dec. 10, 1928   2 Sheets-Sheet 1
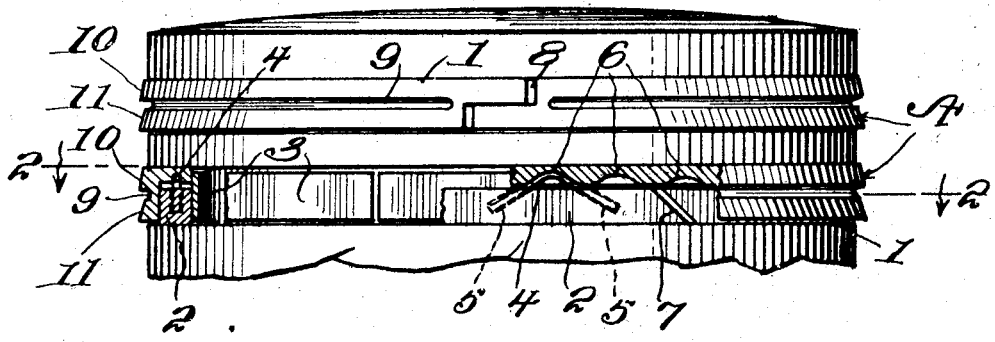
Fig. 1.
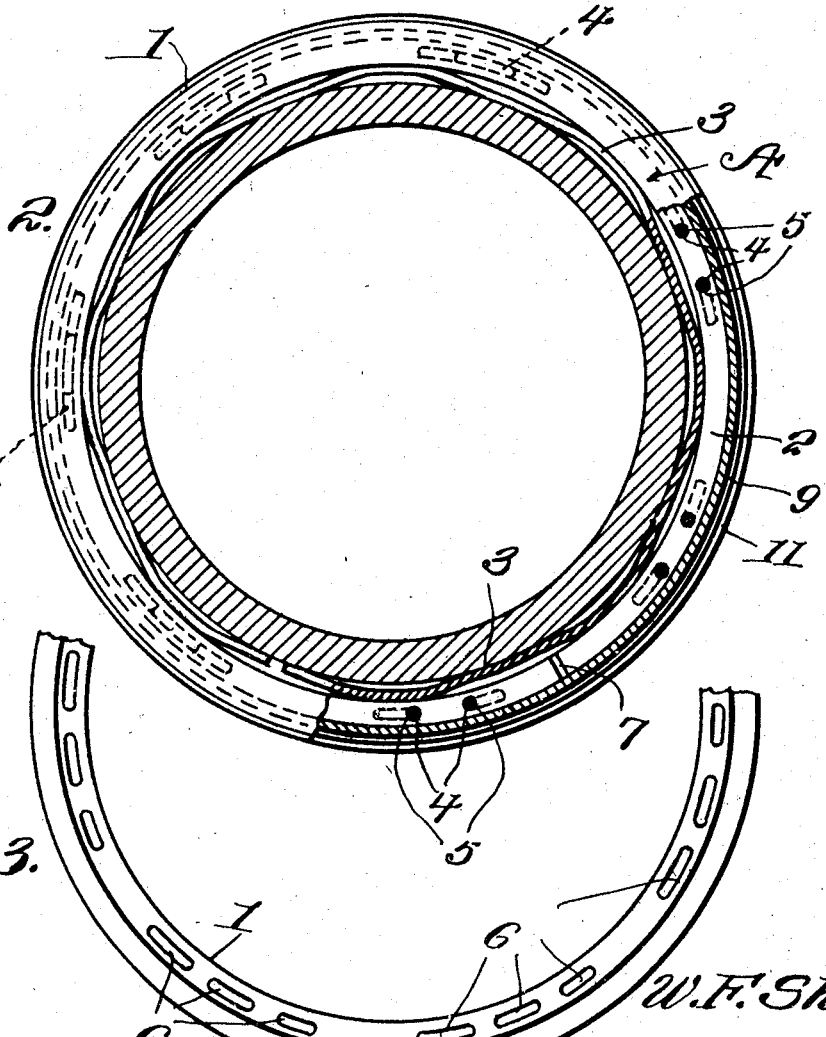
Fig. 2.
Fig. 3.
W. F. Shannon, INVENTOR
BY Victor J. Evans, ATTORNEY
WITNESS:

Aug. 26, 1930.   W. F. SHANNON   1,773,878
PISTON RING
Filed Dec. 10, 1928   2 Sheets-Sheet 2
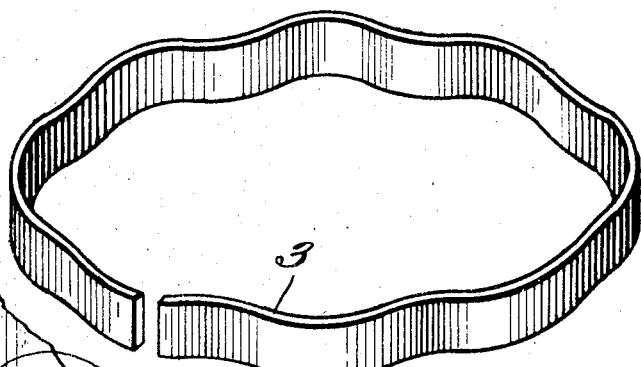
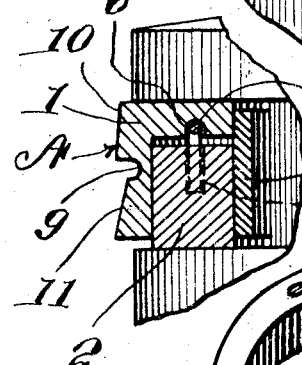
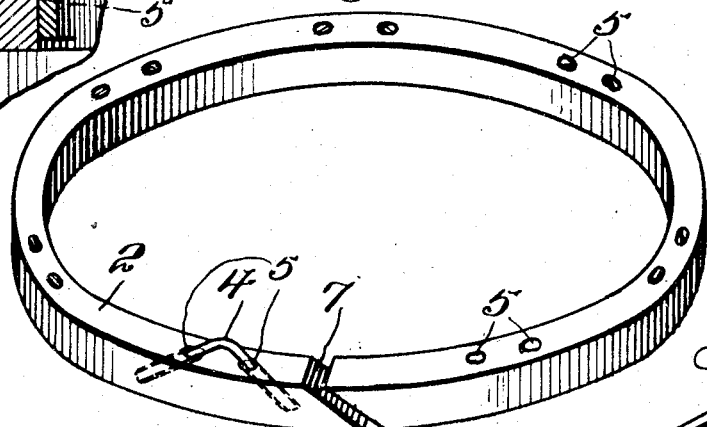
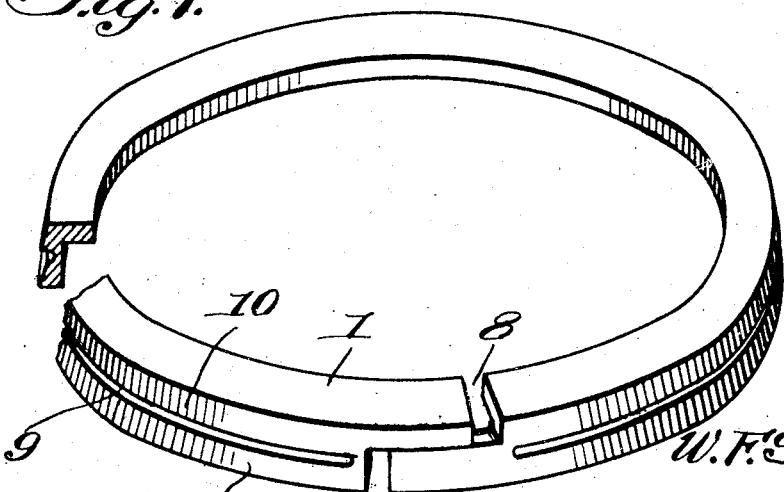
W. F. Shannon INVENTOR
BY Victor J. Evans ATTORNEY
WITNESS: G. T. L. Wright Patented Aug. 26, 1930

1,773,878

UNITED STATES PATENT OFFICE

WARREN F. SHANNON, OF BEAUMONT, TEXAS

PISTON RING

Application filed December 10, 1928. Serial No. 324,927.

This invention relates to a piston ring, the general object of the invention being to provide a ring which will accommodate itself to worn grooves and to make the ring self-seating and also to provide the ring with an exterior oil groove and tapered walls adjacent the groove, whereby the ring will prevent compression leakage and oil leakage and properly seat itself in the groove even though the walls of the groove are worn.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a fragmentary view of a piston, showing the improved rings in use, portions of one ring being shown in section.

Figure 2 is a section on line 2—2 of Figure 1, with parts in elevation.

Figure 3 is a fragmentary bottom plan view of the outer or sealing ring.

Figure 4 is an enlarged sectional view through a portion of the cylinder and through the improved ring.

Figure 5 is a view of the expansion ring.

Figure 6 is a view of the inner or adjusting section of the ring.

Figure 7 is a view of the outer or sealing section of the ring.

Figure 8 is a view of one of the small springs for pressing the sections apart.

As shown in these views, the ring A comprises an outer or sealing section 1, an inner or adjusting section 2 and an expansion ring 3 which is placed between the rear wall of the groove and the two sections and acts to expand the sections to hold the sections 1 against the wall of the cylinder. The section 1 is of right angular shape in cross section and the section 2 is of rectangular shape in cross section, this section 2 fitting in the space formed by the two parts of the section 1, as clearly shown in Figure 4.

A number of small springs 4 of substantially inverted V-shape have their ends or limbs placed in the holes 5 formed in the upper edge of the section 2, with the bight or looped portion of each spring 4 engaging any one of a number of recesses 6 formed in the under face of the top or horizontal part of the section 1, so that these springs 4 tend to force the section 2 away from the top part of the section 1. The recesses 6 are of different depths, as clearly shown in Figure 1, so that by placing each spring 4 in the proper sized recess 6, the space between the two sections can be adjusted and thus the two sections properly adjusted to the width of groove in which they are placed. The section 2 is preferably formed with a diagonally arranged joint 7, as shown in Figure 6, and the section 1 is preferably provided with a stepped joint 8, as shown in Figure 7.

The outer circumference of the section 1 is formed with a centrally arranged groove 9 and the wall above the groove slopes inwardly and upwardly from the groove, as shown at 10, and the wall below the groove slopes downwardly and outwardly from the groove, as shown at 11. Thus this outer face of the section 1 which engages the cylinder wall forms an oil compression seal which lubricates the cylinder wall at all times and also controls the oil on the upward and downward strokes of the piston.

From the foregoing it will be seen that the springs 4 act to hold the lower edge of the section 2 against the bottom wall of the ring groove in the piston and the top face of the horizontal part of the section 1 against the top wall of the groove, thus making the ring properly fit the groove even though the walls of the groove have become worn. The expansion ring 3 tends to move the two sections outwardly and thus holds the outer face of the section 1 against the cylinder wall so that the ring is oil-tight and compression-tight. As before stated, by providing recesses of different depths for the springs 4, the proper expansion of the two sections can be secured by placing the springs in the proper recesses.

As shown, the groove 9 terminates short of the ends of the section so that oil cannot escape from the ends of the groove.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A piston ring of the class described comprising inner and outer sections, the inner section being of rectangular shape in cross section and the outer section being of right-angular shape in cross section with its horizontal part arranged over the inner section, springs of substantially inverted V-shape, the inner section having holes in its top for receiving the ends of the springs and the horizontal part of the outer section having recesses in its under face for receiving the looped portions of the springs, said recesses being of different depths whereby the looped portions of the springs can be placed in a recess of the proper depth.

2. A piston ring of the class described comprising inner and outer sections, the inner section being of rectangular shape in cross section and the outer section being of right-angular shape in cross section with its horizontal part arranged over the inner section, springs of substantially inverted V-shape, the inner section having holes in its top for receiving the ends of the springs and the horizonal part of the outer section having recesses in its under face for receiving the looped portions of the springs, said recesses being of different depths whereby the looped portions of the springs can be placed in a recess of the proper depth, an expansion spring placed between the two sections and the rear wall of the groove, the outer circumference of the outer section having a centrally arranged groove therein, with that part of the outer face below the groove sloping upwardly and inwardly from the groove and that part of the face below the groove sloping outwardly and downwardly from the groove, the inner section having a diagonally arranged joint and the outer section having a stepped joint.

In testimony whereof I affix my signature.

WARREN F. SHANNON.